US008032260B2

(12) United States Patent
Hill, III et al.

(10) Patent No.: US 8,032,260 B2
(45) Date of Patent: Oct. 4, 2011

(54) METHOD AND SYSTEM FOR CONTROLLING A POWER DISTRIBUTION SYSTEM

(75) Inventors: Theodore D. Hill, III, West Hartford, CT (US); Radoslaw Narel, Kensington, CT (US); Marcelo Valdes, Burlington, CT (US)

(73) Assignee: General Electric Company, Schenectady, NY (US)

( * ) Notice: Subject to any disclaimer, the term of this patent is extended or adjusted under 35 U.S.C. 154(b) by 147 days.

(21) Appl. No.: 11/290,008

(22) Filed: Nov. 30, 2005

(65) Prior Publication Data

US 2007/0121265 A1   May 31, 2007

(51) Int. Cl.
*G05D 15/00* (2006.01)

(52) U.S. Cl. .............. 700/293; 700/22; 700/294; 361/3; 361/115

(58) Field of Classification Search ................ 700/292, 700/286, 22, 295; 361/42, 114, 3, 102, 116; 324/511; 714/113–717
See application file for complete search history.

(56) References Cited

U.S. PATENT DOCUMENTS

| | | | |
|---|---|---|---|
| 3,903,807 A | 9/1975 | Lee | |
| 4,073,000 A | 2/1978 | Krejsa | |
| 4,752,853 A | 6/1988 | Matsko et al. | |
| 5,164,875 A | 11/1992 | Haun et al. | |
| 5,253,159 A | 10/1993 | Bilas et al. | |
| 5,343,192 A | 8/1994 | Yensey | |
| 5,455,760 A | 10/1995 | Bilas et al. | |
| 5,475,558 A | 12/1995 | Barjonnet et al. | |
| 5,581,433 A | 12/1996 | Jordan | |
| 5,596,473 A | 1/1997 | Johnson et al. | |
| 5,825,643 A | 10/1998 | Dvorak et al. | |
| 5,872,722 A | 2/1999 | Oravetz et al. | |
| 5,892,449 A | 4/1999 | Reid et al. | |
| 5,909,180 A * | 6/1999 | Bailey et al. .................. 340/639 |
| 5,982,596 A | 11/1999 | Spencer et al. | |
| 6,005,757 A | 12/1999 | Shvach et al. | |
| 6,005,758 A | 12/1999 | Spencer | |
| 6,038,516 A | 3/2000 | Alexander et al. | |
| 6,055,144 A | 4/2000 | Reid | |
| 6,127,882 A | 10/2000 | Vargha et al. | |
| 6,157,527 A | 12/2000 | Spencer et al. | |
| 6,327,130 B1 | 12/2001 | Durif et al. | |
| 6,411,865 B1 | 6/2002 | Qin et al. | |
| 6,489,577 B2 | 12/2002 | Kurata | |
| 6,611,068 B2 | 8/2003 | Cratty | |
| 6,734,768 B2 | 5/2004 | Kim | |
| 6,744,260 B2 | 6/2004 | Schmalz et al. | |
| 6,759,616 B2 | 7/2004 | Rokunohe et al. | |
| 6,810,069 B2 | 10/2004 | Kojovic et al. | |

(Continued)

FOREIGN PATENT DOCUMENTS

EP          0517888 B1      12/1991

(Continued)

*Primary Examiner* — Kakali Chaki
*Assistant Examiner* — Nathan Laughlin
(74) *Attorney, Agent, or Firm* — Armstrong Teasdale LLP

(57) ABSTRACT

A method and system for a power distribution system are provided. The method includes determining at a central controller normal mode configuration settings for a plurality of circuit breakers of the power distribution system and determining at the central controller alternate mode configuration settings for the plurality of circuit breakers of the power distribution system. The method further includes controlling with the central controller the operation of the plurality of circuit breakers based on the normal mode configuration settings and the alternate mode configuration settings.

18 Claims, 8 Drawing Sheets

U.S. PATENT DOCUMENTS

| | | |
|---|---|---|
| 6,892,115 B2 | 5/2005 | Berkcan et al. |
| 6,967,283 B2 | 11/2005 | Rasmussen et al. |
| 6,992,247 B2 | 1/2006 | Rasmussen et al. |
| 7,122,916 B2 | 10/2006 | Nguyen et al. |
| 7,180,717 B2 | 2/2007 | Kojovic et al. |
| 7,203,040 B2 | 4/2007 | Shipp et al. |
| 7,262,943 B2 | 8/2007 | Stellato et al. |
| 2002/0032535 A1 | 3/2002 | Alexander et al. |
| 2003/0009302 A1 | 1/2003 | Leslie |
| 2003/0205938 A1* | 11/2003 | Andarawis et al. ............ 307/11 |
| 2003/0231440 A1* | 12/2003 | Papallo et al. .................... 361/3 |
| 2004/0024475 A1* | 2/2004 | Berkcan et al. ................ 700/22 |
| 2004/0231875 A1 | 11/2004 | Rasmussel et al. |
| 2005/0047045 A1 | 3/2005 | Puskar et al. |
| 2005/0057870 A1 | 3/2005 | Stellato et al. |
| 2005/0207081 A1* | 9/2005 | Ying ............................ 361/105 |
| 2005/0219775 A1 | 10/2005 | Shipp et al. |
| 2005/0240315 A1 | 10/2005 | Booth et al. |

FOREIGN PATENT DOCUMENTS

| | | |
|---|---|---|
| EP | 0588529 A2 | 3/1994 |
| EP | 0717426 A1 | 6/1996 |
| EP | 0933859 A1 | 8/1999 |
| EP | 0957556 A2 | 11/1999 |
| EP | 1511147 A2 | 3/2005 |
| EP | 1583131 A1 | 10/2005 |
| EP | 1385015 A3 | 2/2006 |
| WO | WO92/09899 A1 | 6/1992 |
| WO | WO92/11676 A1 | 7/1992 |
| WO | WO93/12566 A1 | 6/1993 |
| WO | WO94/00824 A1 | 1/1994 |
| WO | WO02/01324 A3 | 1/2002 |
| WO | WO03/030509 A1 | 4/2003 |
| WO | WO2004/038881 A3 | 5/2004 |

* cited by examiner

METHOD AND SYSTEM FOR CONTROLLING A POWER DISTRIBUTION SYSTEM

BACKGROUND OF THE INVENTION

This invention relates generally to methods and systems for controlling power distribution systems, and more particularly to such methods and systems for controlling circuit breakers within the power distribution systems.

Power distribution systems typically include access points, for example, switchgear units having a plurality of circuit breakers for controlling the flow of power through the system and protecting the system, such as, by providing fault protection. Service personnel may need to access these different points to perform maintenance, service, diagnosis, etc. For example, service personnel or operators may need to replace, service and/or perform maintenance on components of the switchgear, and more particularly, circuit breakers of the switchgear. Occasionally, this work is performed on energized equipment due to necessity. The potential energy of typical switchgear is such that in the event of an fault an arch flash will occur resulting in damage to equipment and/or serious harm or death to service personnel can occur.

In order to ensure that power is provided continuously, except to faulted branch(s), circuit breaker delays are added throughout the system. These delays in the circuit protection typically must meet minimum standards for safety. However, the more sensitive a circuit breaker, the easier the circuit breaker will be activated (e.g., tripped by a voltage spike), which could result, for example, in the shut down of a facility or manufacturing plant. Thus, there is a tradeoff between selectivity and safety.

In order to increase safety to personnel working on (and around) these systems, while also maintaining power through the system, it is known to provide localized safety measures. For example, it is known to increase fault sensitivity in a breaker near a service personnel or operator. For example, a button on a breaker or a switchgear box may be activated to increase fault sensitivity to one or more circuit breakers in the switchgear. Sensors, such as on the door of the switchgear box, also may be provided and cause a portion of the switchgear to have reduced power when the door is opened. In general, an individual controller is provided with each circuit breaker that allows local control of the circuit breaker. However, the increased fault sensitivity operation may affect other parts of the power system. Essentially, these safety measures are used to protect individuals working on or around the power system and temporarily increase the susceptibility of the system to nuisance and trip certain branch circuits in order to minimize the impact to equipment and personnel in the event of a fault event.

Thus, known methods and systems for providing safety measures may not adequately factor in the effects on other parts of the overall power system. Accordingly, disruption to the system may result. Further, it is not possible to quickly initiate measures in other portions of the system, if needed, to compensate for or monitor the activation of the safety measures.

BRIEF SUMMARY OF THE INVENTION

In accordance with one embodiment, a method for controlling a power distribution system is provided. The method includes determining at a central controller normal mode configuration settings for a plurality of circuit breakers of the power distribution system and determining at the central controller alternate mode configuration settings for the plurality of circuit breakers of the power distribution system. The method further includes controlling with the central controller the operation of the plurality of circuit breakers based on the normal mode configuration settings and the alternate mode configuration settings.

In accordance with another embodiment, a user interface for controlling a power distribution system is provided that includes a plurality of graphical representations of power sources within the power distribution system and a plurality of graphical representations of circuit breakers within the power distribution system. The plurality of graphical representations of circuit breakers are configured to be toggled between a normal mode configuration and an alternate mode configuration to define operating conditions of a plurality of corresponding circuit breakers in the power distribution system.

In accordance with yet another embodiment, a controller for a power distribution system is provided that includes a communication unit configured to communicate with a plurality of circuit breakers of the power distribution system and a processor configured to determine normal mode configuration settings and alternate mode configuration settings for the plurality of circuit breakers. The processor is also configured to control the operation of the plurality of circuit breakers based on the normal mode configuration settings and the alternate mode configuration settings.

DETAILED DESCRIPTION OF THE INVENTION

Figure 1:
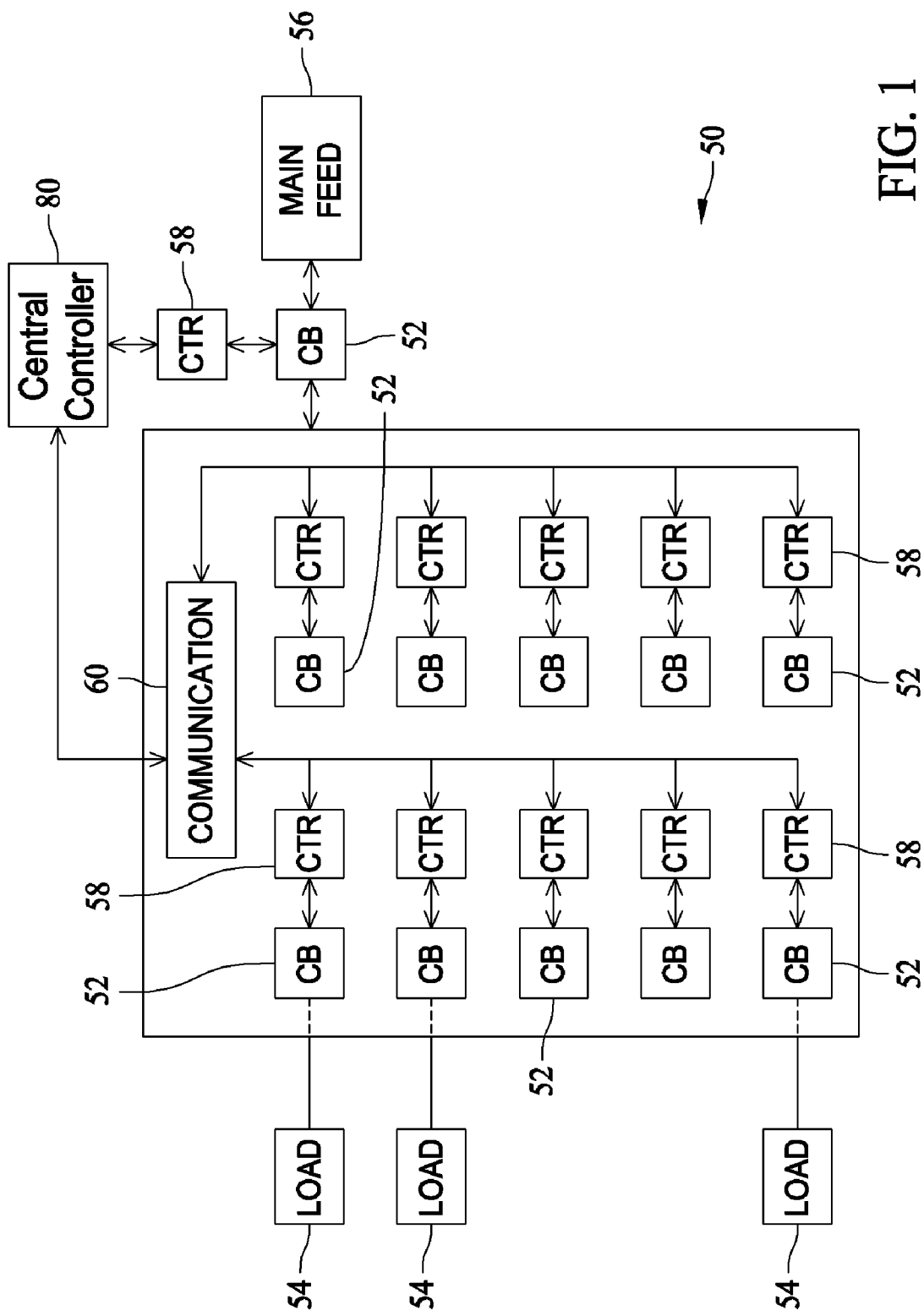
FIG. 1 is a block diagram of a switchgear unit operated in accordance with an embodiment of the invention.

Various embodiments of the invention provide a method and system for controlling power in power distribution systems. For example, as shown in FIG. 1, power may be controlled to components within a switchgear unit 50, which may be configured as a fixed portion of a power control and protection system 70 (shown in FIG. 2). The switchgear unit 50 may be configured as a circuit breaker cabinet or box (not shown) having a plurality of circuit breakers 52 or other power circuit switches or interrupters therein. Each of the circuit breakers 52 is removably connectable to the switchgear unit 50 and is configured to control power to one or more loads 54, such as, but not limited to machinery, motors, lighting, and/or other electrical and electromechanical equipment that may be located within, for example, a manufacturing facility. Power to the switchgear unit 50 is provided from a main power feed 56, which also includes a circuit breaker 52 therebetween. The power is then divided into a plurality of branch circuits using the circuit breakers 52, which supply power to the various loads 54.

Each of the circuit breakers 52 is connected to a local controller 58. The local controllers 58 may be permanently or removably connected to the circuit breakers 52, for example, within the switchgear unit 50. The local controllers 58 provide communication to a central controller 80 and also may be connected to other sensors (not shown) that may sense, for example, motion, door contact closure, etc. This communication between the local controllers 58 and the central controller 80 may be provided directly or through a local communication unit 60. The communication between the local controllers 58 and the central controller 80 may be provided via a hardwired or wireless communication link.

Figure 2:
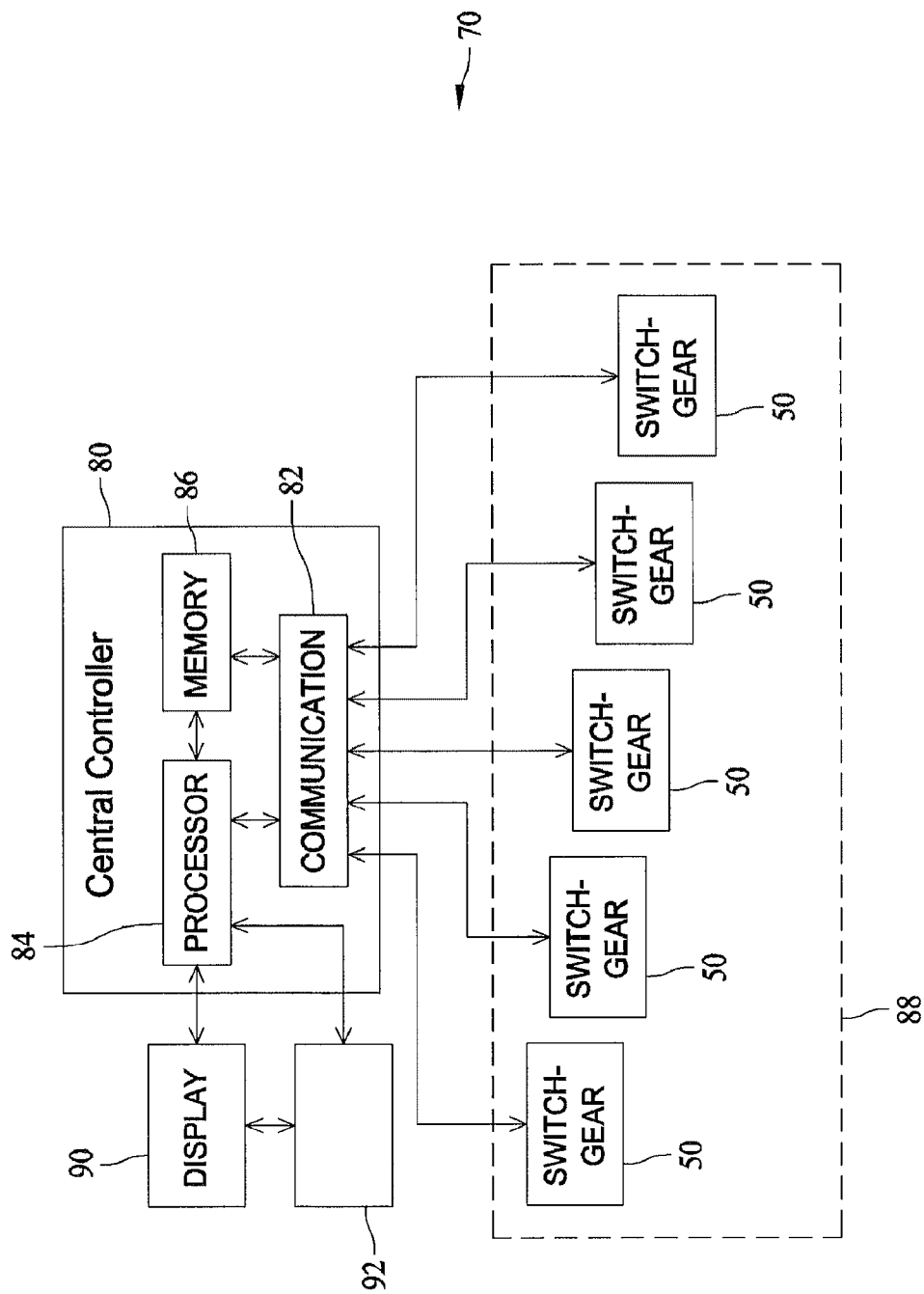
FIG. 2 is a block diagram of a power distribution system having a central controller operated in accordance with an embodiment of the invention.

The central controller 80, as shown more particularly in FIG. 2, controls operation of a plurality of switchgear units 50, each of which are communicatively coupled to a central communication unit 82 of the central controller 80. The central controller 80 also includes a processor 84 and a memory 86. The processor 84 is configured to control operation of the various switchgear units 50, and more particularly, control the operation of the circuit breakers 52 (shown in FIG. 1) as described in more detail below. The plurality of switchgear units 50 generally defines a power distribution system 88. A system for providing communication between the central controller 80 and the various components in a power distribution system 88 is described in more detail in U.S. Pat. No. 6,892,115 titled "Method and Apparatus for Optimized Centralized Critical Control Architecture for Switchgear and Power Equipment" assigned to the assignee of the present invention and incorporated by reference herein in its entirety. However, it should be appreciated that the various embodiments may be implemented in connection with other control or communication systems in connection with a power distribution system.

A display 90 and a user input 92 also may be provided in connection with the central controller 80. The display 90 and user input 92 are configured to provide a user interface to monitor and control the power distribution system 88 with the power control and protection system 70 as described in more detail below.

Figure 3:
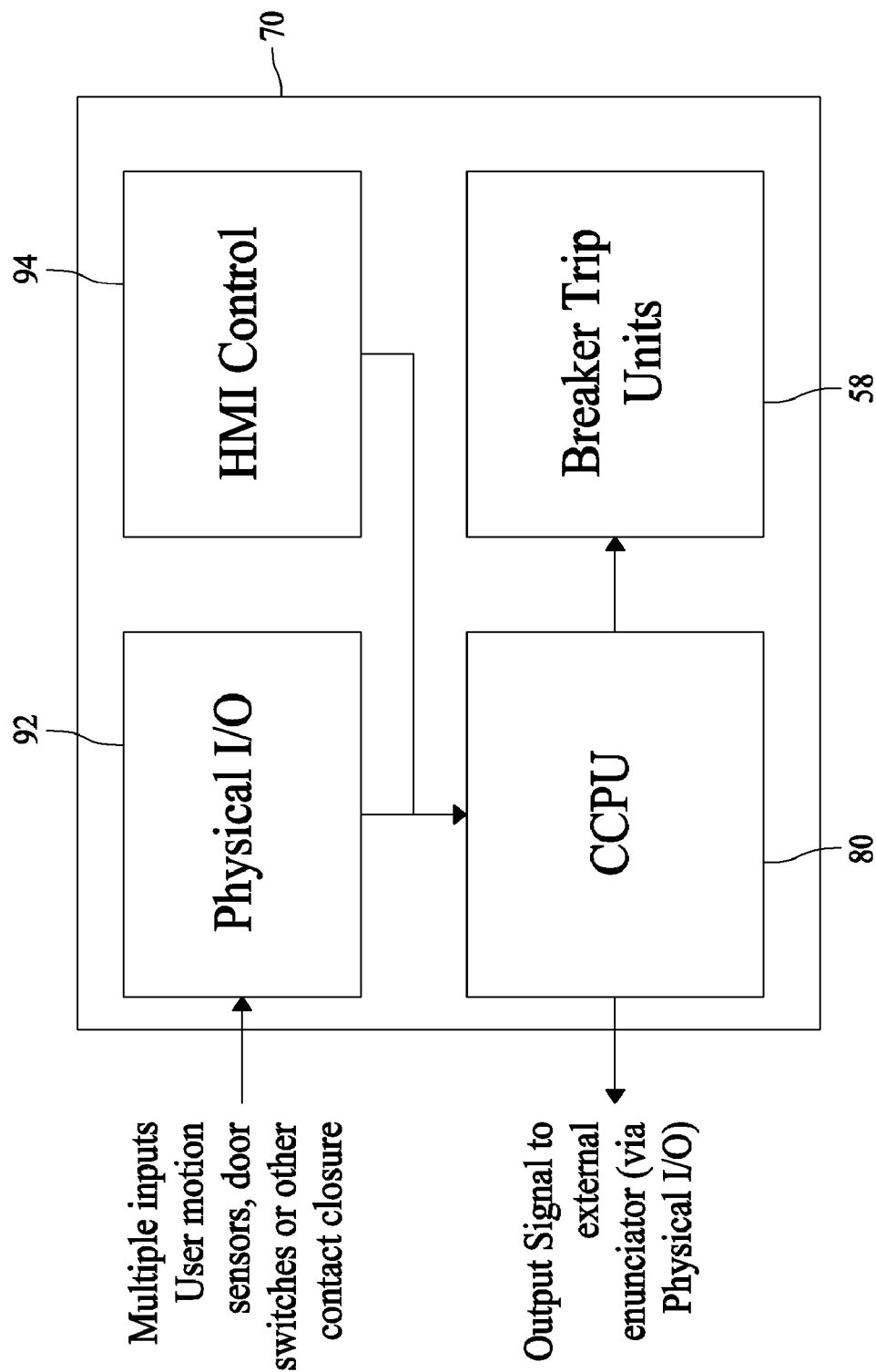
FIG. 3 is a block diagram of a power control and protection system constructed in accordance with an embodiment of the invention.

In one exemplary embodiment, as shown in FIG. 3, the power control and protection system 70 includes a physical input/output (I/O) component 92 that is configured to receive one or more inputs from the switchgear unit 50 or sensors associated therewith. More particularly, sensors in connection with or in proximity to the switchgear unit 50 may sense different conditions or events to provide sensed information to the physical I/O component 92. For example, the sensed information may include information from (i) user motion sensors indicating that an individual is in proximity to a switchgear unit 50, (ii) door switches indicating that a door to a room wherein a switchgear unit 50 is located or a door to the switchgear unit 50 has been opened, (iii) other contact closure or proximity sensors as are known, (iv) an input from a programmable logic controller (PLC), (v) an auxiliary contact on a motor starter, among others. The I/O component 92 is connected to the central processor 80, which is configured to allow a user to create, for example, custom logic that will command one or more circuit breakers 52 (shown in FIG. 1) to different or alternate settings. A user can control these settings through a human machine interface (HMI) control component 94, which may be provided on the display 90 (shown in FIG. 2). The central processor 80 then controls the circuit breakers 52 via the controllers 58 (shown in FIG. 1). For example, the central processor 80 issues a trip signal to trip a circuit breaker 52 based on normal trip settings and/or alternate settings or settings different from the normal trip settings. For example, a user customizable alternate setting for a reduced energy let-thru (RELT) mode or maintenance mode may be defined by a user and issued as a control signal upon the determination of certain conditions or events, such as, sensing with a sensor that an individual is servicing a circuit breaker 52 or by an individual pressing a service button on the switchgear unit 50. The central processor 80 also may provide the alternate circuit breaker setting to an external enunciator (now shown) via a physical I/O, such as the physical I/O 92. The external enunciator may be, for example, a horn or light tower, strobe light or other industrial type signaler. The central processor stores information relating to different settings and configurations in the memory 86 (shown in FIG. 2).

It should be noted that the architecture of the power control and protection system 70 and power distribution system 88 as well as the various components is only exemplary. Other architectures are possible and may be utilized in connection with practicing the processes and interfacing with users as described herein. Also, different alternate modes are contemplated, for example, a seasonal mode, time of day mode and level of load or altered power mode.

Figure 4:
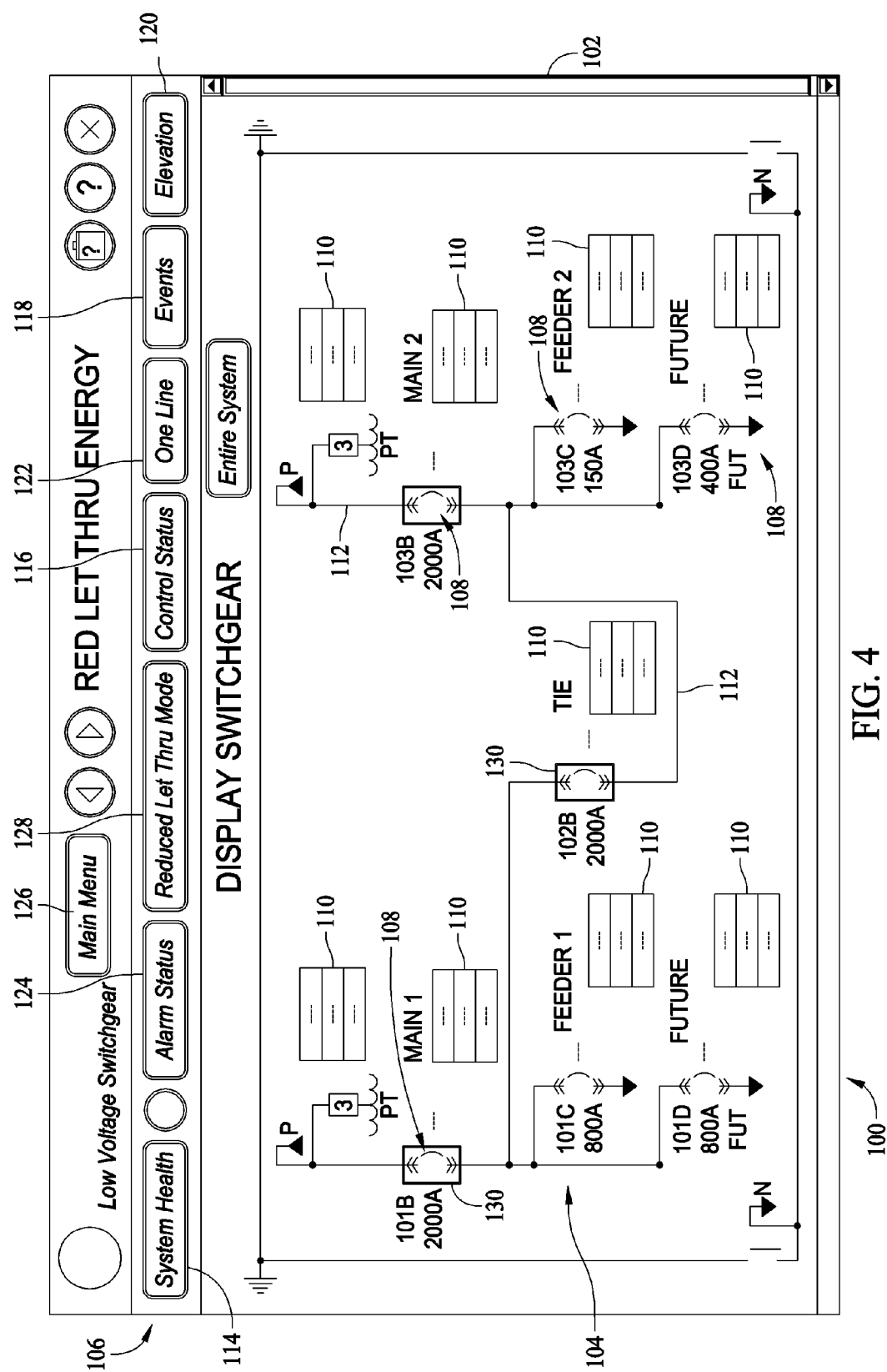
FIG. 4 is a user interface displaying a reduced energy let-thru (RELT) selection screen in accordance with an embodiment of the invention.

Various embodiments of the invention provide a user interface 100 shown in FIG. 4. The user interface 100 is shown displaying a RELT selection screen 102 that may be displayed on the display 90 (shown in FIG. 2). The user interface 100 includes a switchgear control portion 104 and a system control portion 106. The switchgear control portion 104 includes a graphical representation of a switchgear unit and/or a power distribution system. More particularly, a plurality of circuit breaker virtual representations 108, hereafter referred to as circuit breaker icons 108, representing circuit breakers within the switchgear units 50 (shown in FIG. 2) are displayed. It should be noted that when reference is made herein to an icon, this refers to any type of virtual display element or representation that may be displayed on a screen. Further, some or all of the icons may be selectable (e.g., by highlighting with a computer mouse). The switchgear control portion 104 also includes a plurality a power supply icons 110 indicating existing (and/or proposed future) power sources within the power distribution system 88 (shown in FIG. 2). A power flow path 112 is represented by a virtual link between the various components and icons and shows the connection and flow of power between these various components.

The system control portion 106 includes a plurality of selectable elements configured to be selected to control the operation of the power control and protection system 70 and power distribution system 88 (shown in FIG. 2). More particularly, a system health selection member 114 is provided to select an interface for viewing and monitoring system operations including, for example, use of system resources, power usage, power flow, etc. A control status selection member 116 is provided to select a control status interface to allow a user to view the status of the various controls in the system. Other selections members include an events selection member 118 selectable to display events within the system (e.g., when the system enters a RELT mode and the number and names of the circuit breakers in the RELT mode) and an elevation selection member 120 selectable to provide a 3D view of, for example, the switchgear unit 50. A one-line selection member 122 is provided that displays a screen in the format shown in FIG. 4.

An alarm status selection member 124 indicates different alarm conditions in the system, for example, a high current condition or if the system has been in a RELT mode for greater than a predetermined period of time, such as eight hours. Additionally, a main menu selection member 126 is selectable to return a user to a main menu, for example, a main control screen providing different user options.

A reduced let-thru mode selection member 128 is also provided and selectable to toggle the functionality of a highlighted circuit breaker icon 108 to place the circuit breaker 52 (shown in FIG. 1) associated with the circuit breaker icon 108 in a RELT mode as described in more detail below. Upon activating the RELT mode, the circuit breaker icon 108 is provided with a RELT indicator 130, for example, a colored box around the circuit breaker icon 108. It should be noted that when a circuit breaker is placed in RELT mode my selecting the corresponding circuit breaker icon 108, any associated circuit breakers 52 are also placed in the RELT mode and a RELT indicator provided in connection with the corresponding circuit breaker icons 108 for the associated circuit breakers 52. For example, if an operator selects a feeder breaker for RELT mode operation, the system also switches the mains and ties that may feed power to the selected breaker into RELT mode. It should be noted that a circuit breaker is returned to the normal operating mode by again selecting the reduced let-thru mode selection member 128 when a circuit breaker icon 108 is highlighted.

Additional options or functionality also may be provided. For example, a select all selection member may be provided to allow a user to select all of the circuit breakers on a particular screen or in a particular area or switchgear unit. Additionally, a user may be prompted as to which circuit breakers to place in RELT mode and allow selection of particular circuit breakers.

Figure 5:
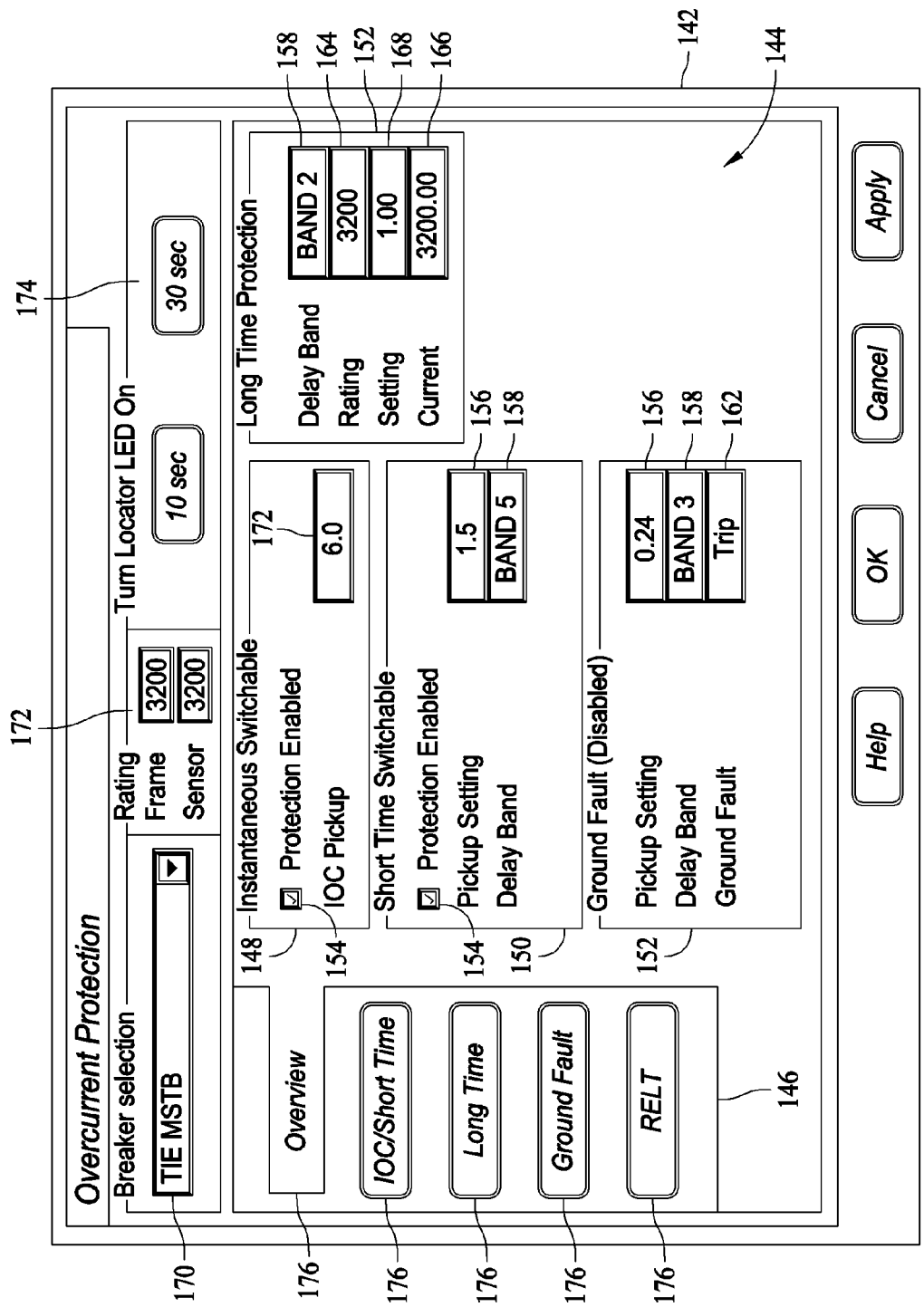
FIG. 5 is a user interface displaying a breaker configuration screen in accordance with an embodiment of the invention.

A user interface 140 displaying a breaker configuration screen 142 as shown in FIG. 5 is also provided and corresponds to each individual circuit breaker 52 represented by the circuit breaker icons 108. The breaker configuration screen 142 allows a user to view and modify the breaker configuration settings of one or more circuit breakers 52. A user may, for example, double click on a circuit breaker icon 108 to access the breaker configuration screen 142. The breaker configuration screen 142 includes a breaker configuration portion 144 and a user selection portion 146. The breaker configuration portion 144 includes an instantaneous switchable portion 148, a short time switchable portion 150, a long time protection portion 152 and a ground fault portion 154. The instantaneous switchable portion 148 and the short time switchable portion 150 each include a Protection Enabled selection member 154 selectable by a user to enable instantaneous and short time switching protection. The instantaneous switchable portion 148, short time switchable portion 150, and ground fault portion 154 each include a Pickup Setting field 156 for entering a maximum current after which the associated circuit breaker is tripped. For example, as shown, in an instantaneous switchable mode as defined by the instantaneous switchable portion 148, the associated circuit breaker is tripped when the current exceeds six times the rated current for the circuit breaker. Upon this event, the circuit breaker is instantaneously tripped. The short time switchable portion 150 and ground fault portion 154 also include a Delay Band field 158 for entering a time period after which the associated circuit breaker is tripped, for example, from several milliseconds to several seconds. For example, as shown, in a short time switchable mode as defined by the short time switchable portion 150, the associated circuit breaker is tripped after a predetermined delay defined by a delay Band 5 (e.g., one second) when the associated circuit breaker exceeds one and a half times the rated current for the circuit breaker.

Other options also may be selected, for example, each portion may include specific fields, for example, a Ground Fault field 162 in the ground fault portion 152 for setting the ground fault condition (e.g., trip). In the long time protection portion 152 a Rating field 164 may indicate the rating of the associated circuit breaker and a Current field 166 may indicate the maximum current for the associated circuit breaker. A Setting field 168 also may be provided to enter long time settings in the long time protection portion 152. In one exemplary embodiment, there are three levels of trip speeds that are based on the amount of current flowing into the fault. In the case of the long time setting as set in the setting field 168, for current above 1× rated current, in the example shown 3200A, the system will wait for time band 2 to time out, which can be up to several seconds. Rating and indicator information for the circuit breaker may be provided in a Rating portion 172 and a Turn Locator LED on portion 174, respectively.

A Breaker Selection field 170 also may be provided and configured as a pull-down menu to select from a plurality of available circuit breakers. Selecting another circuit breaker from the pull-down menu with display the configuration information for that circuit breaker.

Figure 6:
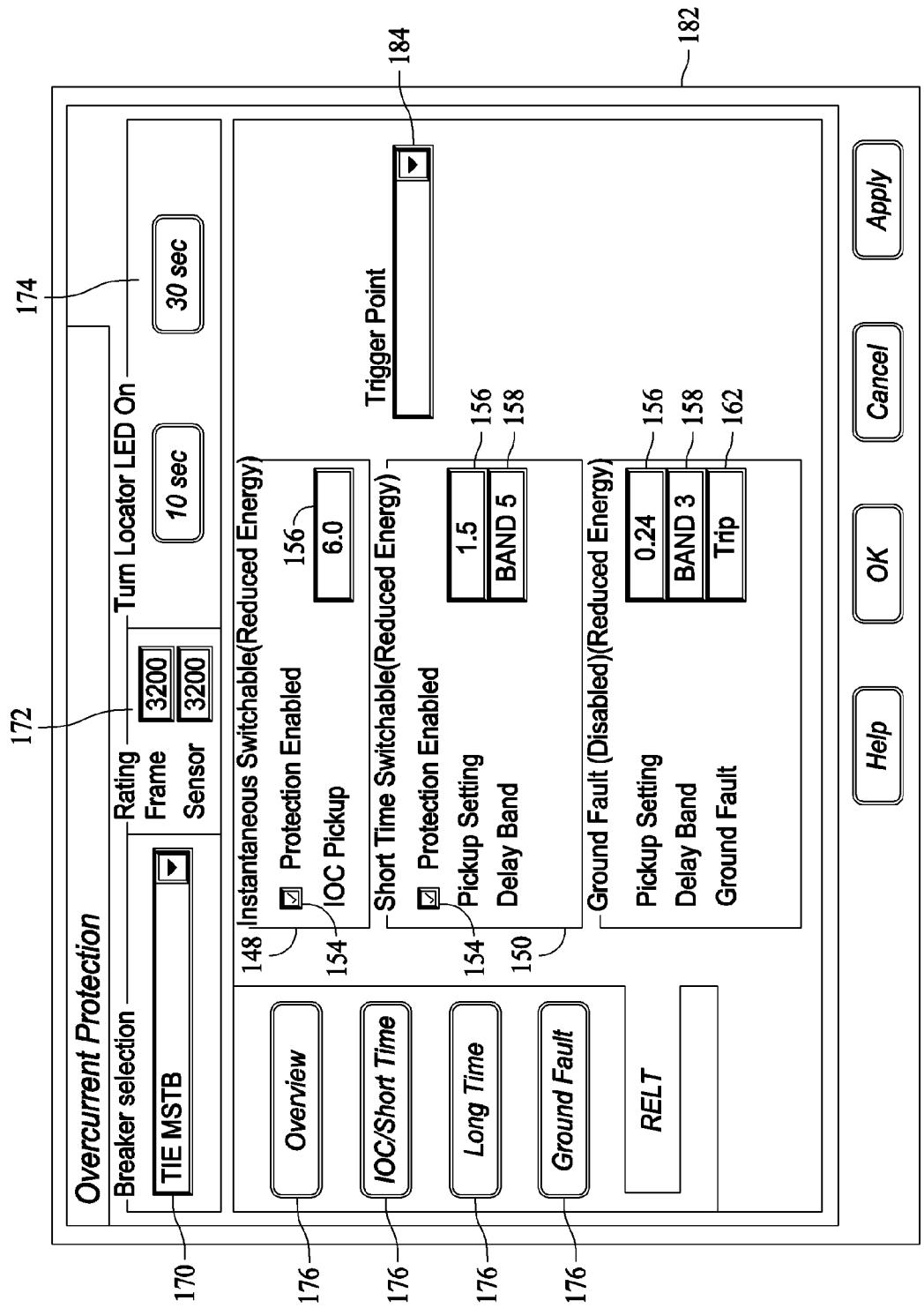
FIG. 6 is a user interface displaying a RELT breaker configuration screen in accordance with an embodiment of the invention.

The user selection portion 146 includes a plurality of user selectable members 176, which may correspond to activating one of the portions in the breaker configuration portion 144 to change the settings as described above. Additionally, one of the user selectable member 176, and in particular, the RELT user selectable member 176, upon selection, provides a user interface 180 displaying a RELT breaker configuration screen 182 as shown in FIG. 6. A separate RELT breaker configuration screen 182 corresponds to each individual circuit breaker 52 represented by the circuit breaker icons 108. The RELT breaker configuration screen 182 is similar to the breaker configuration screen 142 (with like numerals representing like components or members) except without the long time protection portion 152. The RELT breaker configuration screen 182 allows a user to view and modify the RELT settings of one or more circuit breakers. It should be noted that a default breaker configuration screen 182 may be provided wherein the trip settings are set at the fastest levels (e.g., shortest trip setting for each switchable mode) and/or faster levels than the normal mode. In one embodiment, the RELT mode is a maintenance mode wherein the setting for tripping circuit breakers occurs with less delay and/or at a lower pickup setting of the rated current for the circuit breaker.

The RELT breaker configuration screen 182 also includes a Trigger Point field 184, which in one embodiment is configured as a pull-down menu, and allows a user to select a point at which the RELT mode is selected for a particular circuit breaker. For example, this may be upon a sensed event (e.g., switchgear unit door opened), as described in more detail herein. It should be noted that a particular circuit breaker may be placed in RELT mode in different ways. A user accessing the user interface 100 may place a circuit breaker in RELT mode by selecting a circuit breaker icon 108 (shown in FIG. 4) and as described herein. Alternatively, the circuit breaker may be placed in RELT mode automatically based on a sensed condition or event, which may be defined by a trigger point. A circuit breaker also may be placed into RELT mode manually by a user at the switchgear unit, for example, by activating a button on the switchgear unit. Additionally, based on information about the various circuit breakers, the system may place other circuit breakers in the RELT mode.

In operation, each circuit breaker 52 (shown in FIG. 1) has a corresponding breaker configuration screen 142 and a RELT breaker configuration screen 182. Essentially, the RELT breaker configuration screen 182 includes alternate settings for the instantaneous switchable, short term switchable, and ground fault settings than for the normal operating mode. For example, the following rules are implemented in one exemplary embodiment.

1. Switch a main circuit breaker into RELT mode and the associated tie(s) switch into RELT mode (minimizing all settings), and Short Time settings (only) will be minimized for all other mains and ties.

2. Switch a tie main circuit breaker into RELT mode and both associated mains switch into RELT mode (minimizing all settings) and Short Time settings (only) will be minimized for all other mains and ties.

3. Switch a main feeder circuit breaker into RELT mode and, system switches into RELT mode (minimizing all settings).

It should be noted that minimizing settings means that the time band is changed to a minimum selectable setting for the circuit breaker. To ensure that service personnel have changed all circuit breakers that have the potential to introduce current to a fault, the rules above may be enforced. For example, a parallel system (which has both the mains and associated tie closed) will potentially need both mains and tie in RELT mode in order to ensure safety.

Also, flex logic may be provided wherein VOs (virtual) type points allow a flex logic to turn on or off the RELT mode on each of a plurality of breakers independently. A feedback point is provided for each breaker and the flex logic input for a main or tie, and in one exemplary embodiment follows the same rules as above. In one exemplary embodiment, flex logic is a simple embedded programming language, similar to ladder logic. This logic describes the objects that will be available to flex logic and that will allow physical inputs to activate any one of the breakers into RELT mode. It should be noted that one physical input can turn on one or more circuit breakers.

Figure 7:
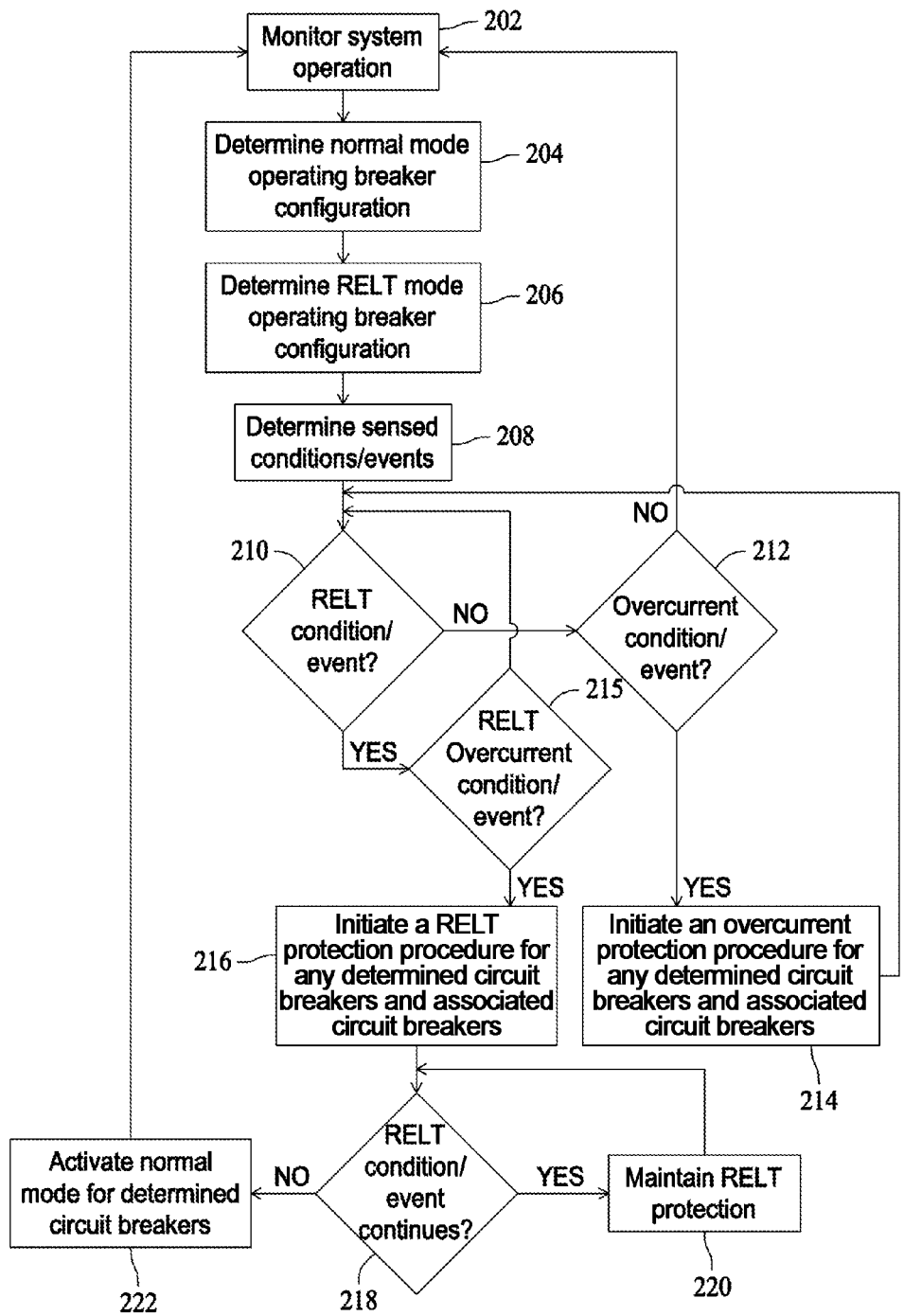
FIG. 7 is a method for selectively switching between a RELT operating mode and a normal operating mode in accordance with an embodiment of the invention.

In operation, various embodiments of the invention include a method 200 as shown in FIG. 7 providing a RELT mode of operation for one or more circuit breakers in a power distribution system. The method provides for selectively switching into the RELT mode each of the plurality of circuit breakers independently or based on the switching of other circuit breakers. The RELT mode of operation generally defines protection or maintenance settings for circuit breakers in a power distribution system. A technical effect of the various embodiments is to provide over current protection and multipoint protection in a power distribution system having a centralized control system and using a RELT mode of operation. Specifically, at 202 the power distribution system is monitored by a controller to determine, for example, the current, voltage, frequency, etc., flowing through the system, and more particularly, through each branch of the system including each of the circuit breakers. Thereafter, at 204 a determination is made as to the normal mode breaker configuration, which is used to control the system during a normal mode of operation. For the normal mode breaker configuration, each circuit breaker in the power distribution system has a breaker configuration as determined and set by, for example, a breaker configuration in an overcurrent protection user interface. The breaker configuration can include settings that define instantaneous protection, short time protection, long time protection and ground fault protection. Each of these protection settings define a condition, and more particularly, a level above the rated current for the circuit breaker, at which a tripping operation is initiated, which may include a delay until the circuit breaker in tripped, except in the instantaneous condition.

Thereafter, at 206 a determination is made as to the RELT mode breaker configuration, which is used to control the system during a RELT mode of operation. For the RELT mode breaker configuration, each circuit breaker in the power distribution system has a breaker configuration as determined and set by, for example, a breaker configuration in a RELT protection user interface. The breaker configuration can include settings that define instantaneous protection, short time protection, and ground fault protection. Each of these protection settings define a condition, and more particularly, a level above the rated current for the circuit breaker, at which a tripping operation is initiated, which may include a delay until the circuit breaker is tripped, except in the instantaneous condition. In the various embodiments, these RELT settings are typically configured to provide faster tripping of the circuit breakers or tripping at lower current levels.

At 208 a determination is made as to whether there are any sensed conditions or events. This may include automatic sensed events or conditions resulting from manual activation. For example, and as described in more detail herein, a determination may be made as to whether a motion sensor in proximity to a switchgear unit has sensed motion or a door switch on a switchgear unit has been activated by the opening or closing of a door, indicating a RELT condition/event. Additionally, a determination may be made as to whether a manual activation has occurred, for example if an individual has activated a maintenance switch or button in connection with a switchgear unit, indicating a RELT condition/event. Thereafter, at 210, a determination is made as to whether a RELT condition or event has occurred based on the sensed conditions/events at 208. If no RELT event/condition has occurred, then the system is still in the normal mode of operation and at 212 a determination is made as to whether an overcurrent condition/event has occurred. If no overcurrent condition/event has occurred as 212, then the process again returns to monitoring system operation at 202, which may also include determining whether any normal mode or RELT mode configuration settings have been modified. It should be noted that the configuration settings and other associated information may be stored in a memory of a central controller.

If an overcurrent condition/event has occurred, then at 214 an overcurrent protection procedure is initiated for any circuit breakers and associated circuit breakers wherein such a condition/event occurred. The overcurrent protection procedure includes tripping the circuit breaker as defined in the configuration settings, for example, after a predetermined delay if the overcurrent condition/event continues. The tripping continues until the condition/event no longer exists. Thereafter, a determination is again made at 210 as to whether a RELT condition/event has occurred. If a RELT condition/event has now occurred or if such a condition/event occurred as determined by the sensed conditions/events at 208, then at 215 a determination is made as to whether a RELT overcurrent condition/event has occurred. If a RELT overcurrent condition/event has not occurred, then a determination is again made at 210 whether a RELT condition/event has occurred, which may be after a predetermined time period, at predetermined intervals or continuously. If a RELT overcurrent condition/event has occurred as determined at 215, then at 216 a RELT protection procedure is initiated for any circuit breakers and associated circuit breakers wherein such a condition/event occurred. The RELT protection procedure includes tripping the circuit breaker as defined in the RELT configuration settings, for example, after a predetermined delay if the RELT overcurrent condition/event occurs, which delay, in one exemplary embodiment, is less than the delay during the normal mode of operation.

Thereafter at 218 a determination is made as to whether the RELT condition/event continues. If the RELT condition/event continues, then at 220 the RELT protection procedure is maintained, for example, the trip/short circuit is maintained. If at 218 a determination is made that the RELT condition/event does not continue, then at 222 the normal mode of operation is again initiated, which may include restoring the tripped circuit breaker(s).

Figure 8:
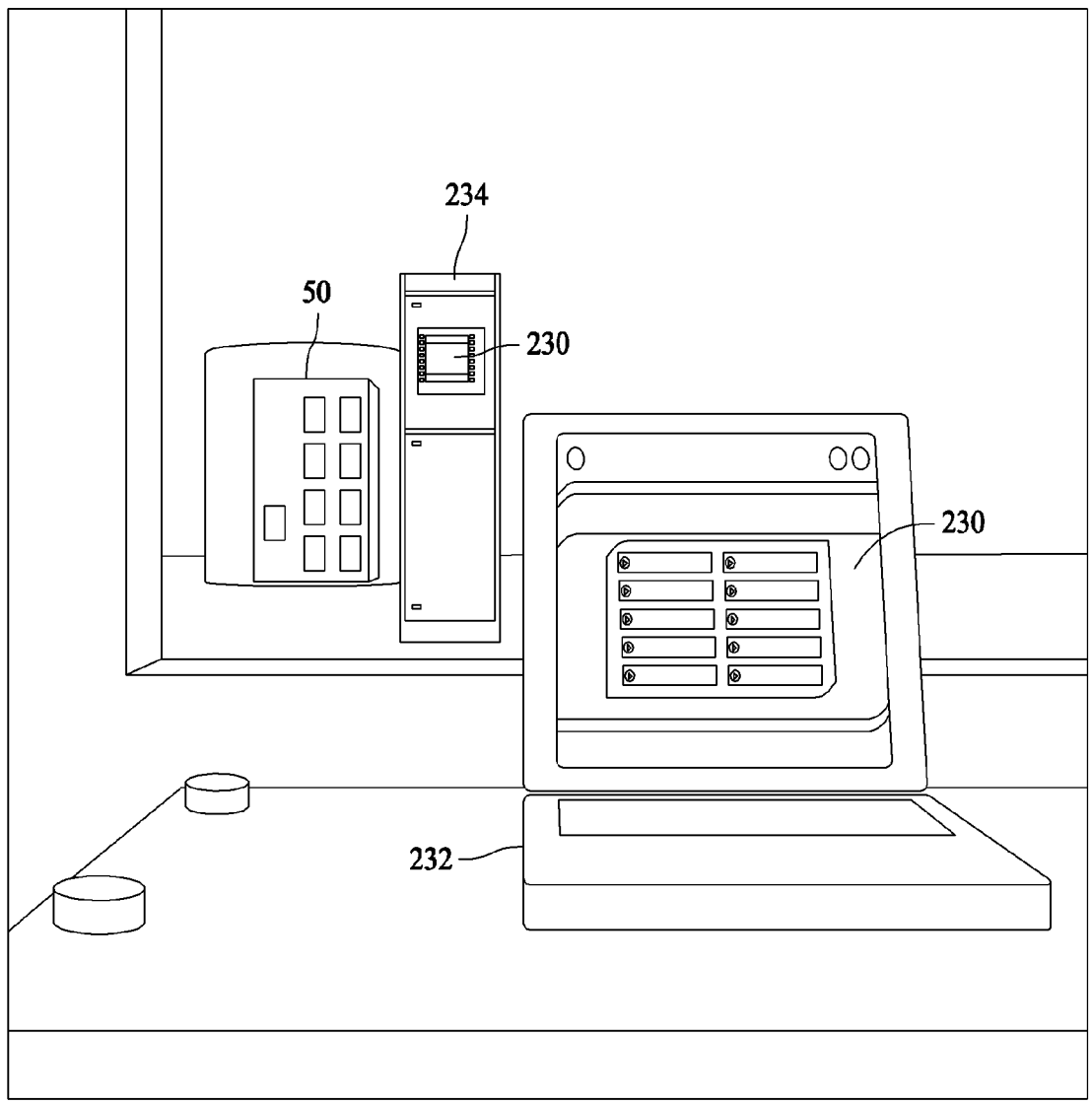
FIG. 8 is a perspective view of a power distribution system having a central controller constructed in accordance with an embodiment of the invention.

Thus, as shown in FIG. 8, a centralized system for monitoring and controlling power distribution systems is provided. In particular, a user interface 230, which may be configured according to the various embodiments described herein, allows a user to monitor and set different operating settings for each of a normal mode of operation and a RELT mode of operation. The user interface 230 may be provided on, for example, a laptop computer 232 or other processing machine. This configuration provides remote access and control. Based upon the configuration settings, user inputs, and/or sensed conditions/events, various embodiments of the invention control a plurality of circuit breakers (shown in FIG. 1) provided as part of a plurality of switchgear units 50 (shown in FIGS. 1 and 2). Alternatively, or in addition, a stand alone controller 234 may be provided to allow a user access to the user interface 230. Accordingly, the tripping of various circuit breakers may be performed after different delays or at different sensed levels based on the whether the circuit breaker is in a normal or RELT mode of operation. Using a centralized controller also allows for changing other circuit breaker settings and operation, either manually or automatically based on the operations of certain circuit breakers.

The various embodiments or components, for example, the central controller 80, or the associated components, may be implemented as part of one or more computer systems, which may be separate from or integrated with a power distribution system. The computer system may include a computer, an input device, a display unit and an interface, for example, for accessing the Internet. The computer may include a microprocessor. The microprocessor may be connected to a communication bus. The computer may also include a memory. The memory may include Random Access Memory (RAM) and Read Only Memory (ROM). The computer system further may include a storage device, which may be a hard disk drive or a removable storage drive such as a floppy disk drive, optical disk drive, and the like. The storage device may also be other similar means for loading computer programs or other instructions into the computer system.

As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer".

The computer system executes a set of instructions that are stored in one or more storage elements, in order to process input data. The storage elements may also store data or other information as desired or needed. The storage element may be in the form of an information source or a physical memory element within the processing machine.

The set of instructions may include various commands that instruct the computer as a processing machine to perform specific operations such as the methods and processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

While the invention has been described in terms of various specific embodiments, those skilled in the art will recognize that the invention can be practiced with modification within the spirit and scope of the claims.

What is claimed is:

1. A method for controlling a power distribution system, said method comprising:
    defining at a central controller at least one normal mode configuration setting for at least one of a plurality of circuit breakers of the power distribution system;
    defining at the central controller at least one alternate mode configuration setting for the at least one of the plurality of circuit breakers of the power distribution system, wherein the at least one alternate mode configuration setting includes a reduced energy let-thru (RELT) mode setting;
    selecting with the central controller one of at least one normal mode configuration setting and at least one alternate mode configuration setting for the at least one of the plurality of circuit breakers based on at least one event; and
    automatically operating the at least one of the plurality of circuit breakers using said one of the at least one normal mode configuration setting and the at least one alternate mode configuration setting, wherein the at least one normal mode configuration setting provides that, upon a trip condition, the at least one of the plurality of circuit breakers trips after a normal mode tripping delay, and wherein the RELT mode setting provides that, upon a trip condition, the at least one of the plurality of circuit breakers trips faster than the normal mode tripping delay.

2. The method in accordance with claim 1 further comprising communicating with the at least one of the plurality of circuit breakers using the central controller associated with the at least one of the plurality of circuit breakers.

3. The method in accordance with claim 1 further comprising receiving at the central controller an indication of the at least one event, and wherein the at least one event includes a predetermined RELT condition from a sensor associated with the at least one of the plurality of circuit breakers.

4. The method in accordance with claim 3 wherein the sensor comprises at least one of a motion sensor, proximity sensor, door switch, maintenance switch, input from a programmable logic controller (PLC), and an auxiliary contact on a motor starter.

5. The method in accordance with claim 1 wherein the RELT mode setting defines a RELT mode tripping delay, and and wherein the normal mode tripping delay is longer than the RELT mode tripping delay.

6. The method in accordance with claim 1 further comprising defining a trigger point according to a sensed condition such that the at least one alternate mode configuration setting is used to control the at least one of the plurality of circuit breakers associated with the trigger point.

7. The method in accordance with claim 1 further comprising receiving a user input, at a user interface of the central controller, to modify one of the at least one normal mode configuration setting and the at least one alternate mode configuration setting.

8. The method in accordance with claim 1 wherein the at least one alternate mode configuration setting comprises at least one of instantaneous switching settings, short time switching settings, and ground fault switching settings.

9. The method in accordance with claim 1 further comprising automatically controlling the at least one of the plurality of circuit breakers based on predetermined criteria at the central controller.

10. A controller for a power distribution system, said controller comprising:
a communication unit configured to communicate with a plurality of circuit breakers of the power distribution system; and
a processor configured to:
select one of at least one normal mode configuration setting and at least one alternate mode configuration setting for at least one of the plurality of circuit breakers based on at least one event, the at least one normal mode configuration setting defining a normal mode tripping delay, wherein the alternate mode configuration setting is a reduced energy let-thru (RELT) mode configuration setting;
automatically operate the at least one of the plurality of circuit breakers using the selected one of the at least one normal mode configuration setting and the at least one alternate mode configuration setting; and
upon a trip condition, in the event the at least one alternate mode configuration setting is selected, trip the at least one of the plurality of circuit breakers faster than the normal mode tripping delay.

11. The controller in accordance with claim 10 further comprising a user interface configured to receive user modifications to at least one of the at least one normal mode setting and the RELT mode configuration setting.

12. A method for controlling a power distribution system including a plurality of circuit breakers, said method comprising:
selecting, with a central controller, one of at least one normal mode configuration setting and at least one alternate mode configuration setting for at least one of the plurality of circuit breakers based on at least one event, the at least one normal mode configuration setting defining a normal mode tripping delay, the at least one alternate mode configuration setting including a reduced energy let-thru (RELT) mode setting; and
upon a trip condition, in the event the at least one alternate mode configuration setting is selected, automatically tripping, with the central controller, the at least one of the plurality of circuit breakers faster than the normal mode tripping delay.

13. The method in accordance with claim 12 wherein the RELT mode setting defines a RELT mode tripping delay.

14. The method in accordance with claim 13 wherein the normal mode tripping delay is longer than the RELT mode tripping delay.

15. The method in accordance with claim 12 wherein the RELT mode setting defines an instantaneous switching setting.

16. The method in accordance with claim 12 wherein the at least one event comprises a condition of a sensor associated with the at least one of the plurality of circuit breakers.

17. The method in accordance with claim 16 wherein the sensor comprises at least one of a motion sensor, proximity sensor, door switch, maintenance switch, input from a programmable logic controller (PLC), and an auxiliary contact on a motor starter.

18. The method in accordance with claim 12 further comprising receiving a user input, at a user interface of the central controller, to modify at least one of the at least one normal mode configuration setting and the at least one alternate mode configuration setting.

\* \* \* \* \*